(12) United States Patent
Akervoll

(10) Patent No.: US 8,319,359 B2
(45) Date of Patent: Nov. 27, 2012

(54) DEVICE FOR WAVE-POWERED GENERATOR

(75) Inventor: Olaf Akervoll, S. B. Messines (PT)

(73) Assignee: Craft Services AS, Stavanger (NO)

( * ) Notice: Subject to any disclaimer, the term of this patent is extended or adjusted under 35 U.S.C. 154(b) by 631 days.

(21) Appl. No.: 12/528,948

(22) PCT Filed: Mar. 3, 2008

(86) PCT No.: PCT/NO2008/000076
§ 371 (c)(1),
(2), (4) Date: Aug. 27, 2009

(87) PCT Pub. No.: WO2008/115066
PCT Pub. Date: Sep. 25, 2008

(65) Prior Publication Data
US 2010/0032950 A1 Feb. 11, 2010

(30) Foreign Application Priority Data
Mar. 16, 2007 (NO) .................................. 20071410

(51) Int. Cl.
*F03B 13/10* (2006.01)
*F03B 13/12* (2006.01)
*H02P 9/04* (2006.01)
(52) U.S. Cl. ............................................ 290/42; 290/53
(58) Field of Classification Search .................... 290/42, 290/54; 60/495–502; 417/331–333
See application file for complete search history.

(56) References Cited

U.S. PATENT DOCUMENTS

| 738,996 | A | * | 9/1903 | Hagen | 417/332 |
| 978,685 | A | * | 12/1910 | Atkinson | 426/643 |
| 1,482,713 | A | * | 2/1924 | Stein | 192/48.7 |
| 2,052,780 | A | * | 9/1936 | Lindner et al. | 417/328 |
| 3,394,658 | A | | 7/1968 | Johnson | |
| 4,241,579 | A | * | 12/1980 | Borgren | 60/504 |
| 4,392,060 | A | | 7/1983 | Ivy | |

FOREIGN PATENT DOCUMENTS

| ES | 2148108 A2 | 10/2000 |
| WO | 9527851 A | 10/1995 |
| WO | 2007/086750 A | 8/2007 |

OTHER PUBLICATIONS

International Search Report dated Nov. 4, 2008 to corresponding international patent application No. PCT/NO2008/000076, 3 pages.

* cited by examiner

*Primary Examiner* — Julio Gonzalez
(74) *Attorney, Agent, or Firm* — Maier & Maier PLLC

(57) ABSTRACT

A device for a wave-powered generator which is provided with at least one energy generator and lines for transferring energy to a consumer, the wave-powered generator comprising a main module provided with a running rod which is substantially vertical in its longitudinal extent, several supporting devices arranged around a portion of the running rod and arranged for sliding or rolling movement on surface portions extending in the longitudinal direction of the running rod, at least one sheave which is arranged to roll on the running rod, and transmission means which are arranged to translate the rotating motion of the at least one sheave into rotation of the drive shaft of the at least one generator; and a first float which is floatingly disposed in an area affected by waves and which is connected to the running rod by a primary driving line substantially of tensile strength.

3 Claims, 3 Drawing Sheets

DEVICE FOR WAVE-POWERED GENERATOR

RELATED APPLICATIONS

The present invention claims priority under 35 U.S.C. §119 to Norwegian Patent Application No. NO 20071410, filed on Mar. 16, 2007, the disclosure of which is incorporated by reference herein in its entirety.

BACKGROUND

The invention relates to a driving device for converting a linear movement induced by wave motion on a water surface into a unidirectional, rotational motion, more specifically a stationary main module comprising means for sliding or rolling movement of a running rod engaged in a drive which drives an energy generator through the wave-induced vertical movement of the running rod, the running rod extending substantially in a vertical direction. Transmission means provide a unidirectional direction of rotation in the energy generator when the moving direction of the running rod changes.

In the following description the terms "wave-powered generator" and "generator" are used in part for devices which are arranged to produce electrical current. It is within the scope of the invention that the "wave-powered generator" and the "generator" may just as well produce energy of some other form, for example by a pump supplying liquid under pressure. Therefore, the terms "wave-powered generator" and "generator" should be understood to be broader than the narrow sense, that is to say related to electrical energy, that these expressions have in everyday language.

There are known many different systems for exploiting wave and tidal force for the production of energy, for example electrical current. The problems within this field have been that the technical equipment has not been able to withstand the heavy loads inflicted on a wave-powered generator by the waves, and the efficiency has been too poor. To prevent a breakdown, it has been attempted to move the wave-powered generator to areas with "calmer" sea and weather conditions. Naturally, this has led to poorer wave power exploitation and efficiency.

The invention has for its object to remedy or reduce at least one of the drawbacks of the prior art.

The object is achieved through features specified in the description below and in the claims that follow.

SUMMARY

For maximum utilization of a wave- and tide-powered generator it is necessary to place the equipment in areas that are exposed to storms and powerful waves. It is an object of the invention to provide a wave-powered generator, in which only one of the main elements of the wave-powered generator, a float, is located in the area in which the wave power is effective, whereas the rest of the wave-powered generator, a main module, is placed submerged below the sea surface and at a depth at which the wave substantially do not propagate, possibly on land, the float and the main module being connected, with tensile strength, by stays and/or wires, chains or similar, for transmitting wave motion from the float to the main module.

The invention relates, in particular, to a device for a wave-powered generator which is provided with at least one energy generator, in what follows also referred to as a generator, and lines for transferring energy to a consumer, for example electrical current or liquid under pressure, the wave-powered generator comprising a main module preferably anchored sub-merged in water, and a running rod disposed substantially vertically, provided with longitudinal, continuous side surfaces, being connected to the main module, the running rod being supported in a rolling or sliding manner by several means arranged on the main module, and at least one sheave being arranged to roll on one of the side surfaces of the running rod as the running rod moves in its longitudinal direction. Furthermore, the device includes transmission means which are arranged to translate the rotating motion of the at least one sheave into rotation of the at least one generator; and a float which is floatingly disposed in an area affected by waves and is connected to the running rod by a driving line substantially of tensile strength. Alternatively, the main module is placed on land.

In a first aspect the invention relates in particular to a device for a wave-powered generator which is provided with at least one energy generator and lines for transferring energy to a consumer, characterized by the wave-powered generator comprising:
a main module provided with
a running rod which is substantially vertical in its longitudinal extent,
several supporting devices arranged around a portion of the running rod and arranged for sliding or rolling movement on surface portions extending in the longitudinal direction of the running rod,
at least one sheave which is arranged to roll on the running rod, and
transmission means which are arranged to translate the rotating motion of the at least one sheave into rotation of the drive shaft of the at least one generator; and
a first float which is floatingly disposed in an area affected by waves and which is connected to the running rod by a primary driving line substantially of tensile strength.

The transmission means are advantageously arranged to translate the rotating motion of the at least one sheave into rotation of the drive shaft of the at least one generator in a predetermined direction.

The transmission means comprise transmission elements which are arranged to maintain the predetermined direction of rotation of the at least one generator Independently of the direction of rotation of the at least one sheave.

The transmission means comprise at least two free-wheels.

The opposite contact surfaces of the at least one sheave and running rod are provided with means which are arranged to prevent or reduce the risk of slippage during the rotation of the at least one sheave on the running rod.

The opposite contact surfaces of the at least one sheave and running rod are preferably cogged.

Advantageously, the main module is disposed submerged in water and is floatingly disposed above the seabed as it is provided with buoyancy elements and also anchoring means secured to the sea floor.

Alternatively, the main module is disposed on land.

Preferably, the running rod is provided with ballast.

Advantageously, the generator is an electric generator or a pump.

In a second aspect the invention advantageously relates to a second float which is floatingly arranged in an area affected by waves and is connected to the primary driving line via a secondary driving line and positioned at a distance from the first float.

Preferably, the distance between the first and second floats substantially corresponds to the wave frequency and wave length, so that when the first float is on a wave crest, the second float is in a wave trough.

In a third aspect the invention advantageously relates to a device for adjusting the distance between the first and second floats, the device comprising a positioning guide for the secondary driving line, means for registering the speed and direction of motion of the first driving line, means for calculating a desired distance between the first and second floats and means which are arranged to adjust the distance between the positioning guide and the running rod.

BRIEF DESCRIPTION OF THE DRAWINGS

In what follows, there is described a non-limiting example of a preferred embodiment which is visualized in accompanying drawings, in which.

DETAILED DESCRIPTION

Figure 1:
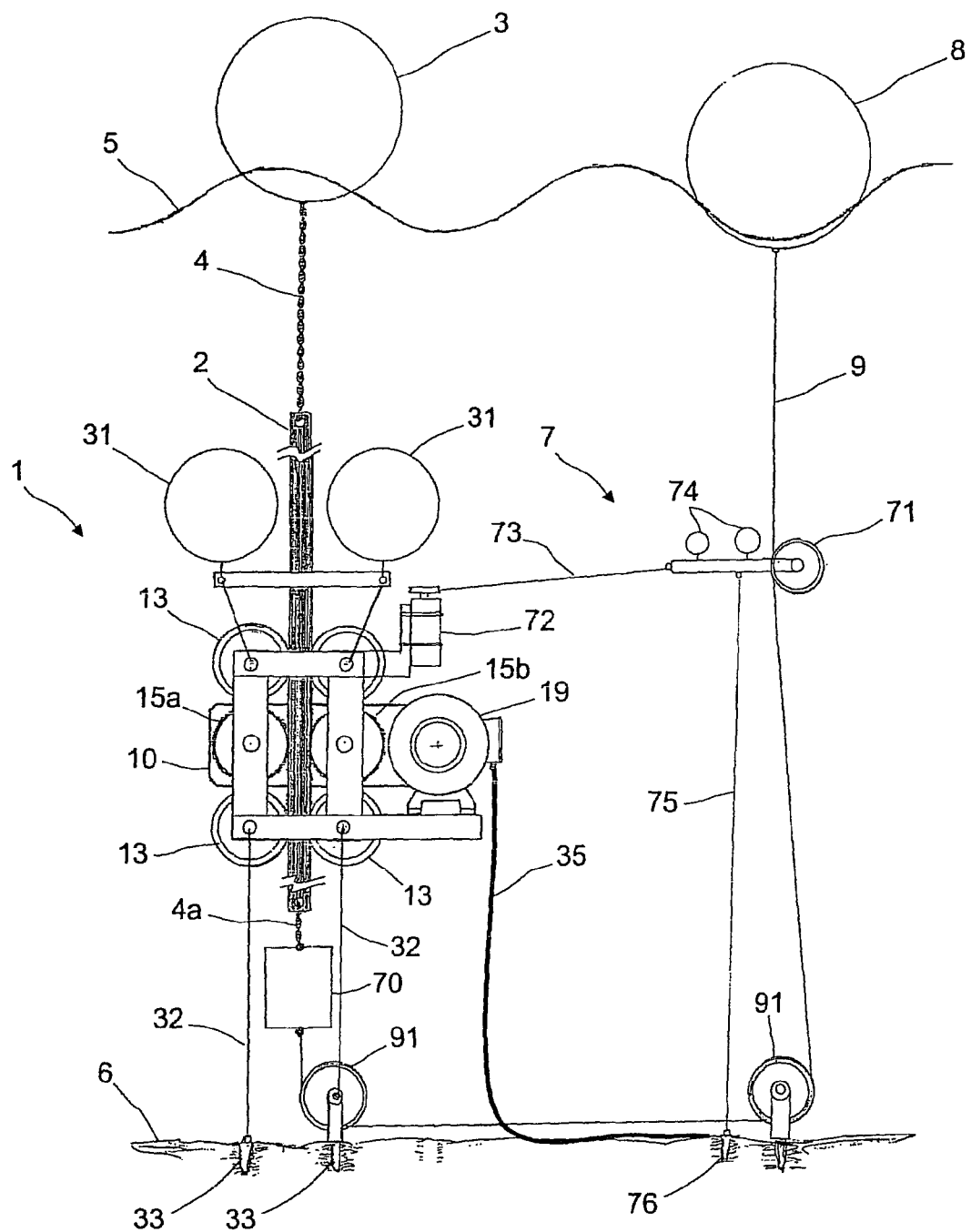
FIG. 1 shows a principle drawing of a wave-powered generator with a vertical running rod according to the invention, viewed from the side.
Figure 2:
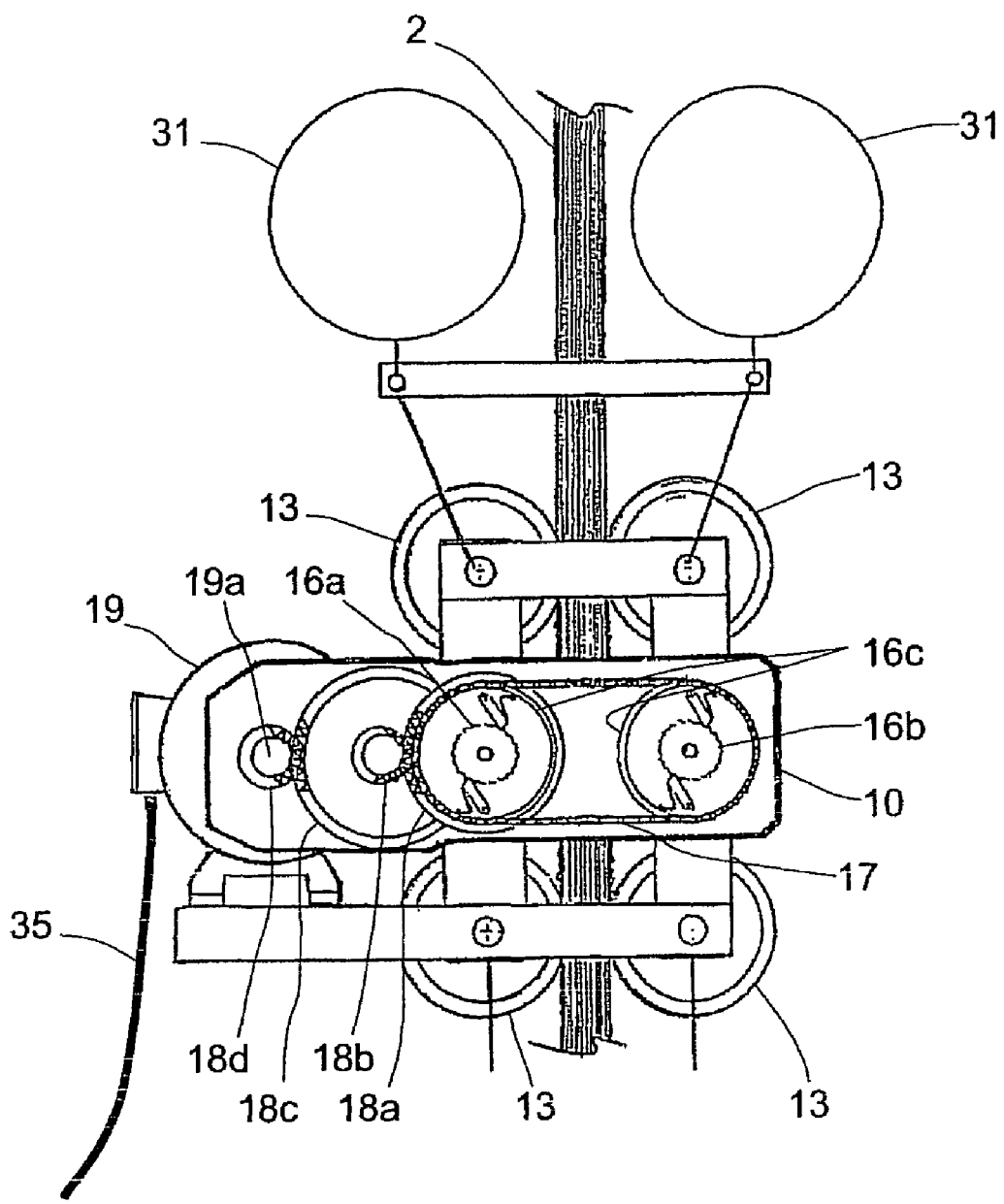
FIG. 2 shows, on a larger scale, a principle drawing of a section of the wave-powered generator according to the invention, viewed from the opposite side relative to FIG. 1.

A main module 1 is anchored to a sea floor 6 by means of stays 32 and anchors 33. The main module 1 is provided with buoyancy elements 31 in order to float in a submerged state. Further, the main module is provided with a generator 19.

A running rod 2 is arranged vertically, extending through the main module 1. The main module 1 is provided with several supporting devices for the running rod in the form of guiding sheaves 13 which are arranged to roll on one of the side surfaces of the running rod 2. By means of a driving line 4, the 5 running rod 2 is connected to a float 3 floating on a water surface 5. The main module is further provided with two sheaves 15a, 15b.

The main module 1 comprises transmission means 10 in the form of two free-wheels 16a, 16b, each coaxially connected to a sprocket 16c and to the sheaves 15a, 15b, and interconnected via a drive chain 17 via the two sprockets 16c. One free-wheel 16a is also connected to a gear 18a which is connected via gearwheels 18b, 18c, 18d to the drive shaft 19a of the generator 19. The sheaves 15a, 15b are arranged to engage a cogged portion (not shown) on the running rod 2, the cogged portion extending along substantially the entire longitudinal extent of the running rod 2. The transmission means 10 provide for the drive shaft 19a of the generator 19 to be rotated when the drive 10 is set into rotation by the vertical movement of the running rod 2 relative to the main module 1.

It is obvious to a person skilled in the art that the length of the running rod 2 must be adapted for the dimensioning wave height in the area in which the wave-powered generator is to be disposed.

The free-wheels 16a, 16b are arranged to be drivingly engaged in a first direction of rotation. By the fact that the freewheels 16a, 16b are each connected to a respective one of the sheaves 15a, 15b which are arranged on respective sides of the running rod 2, one particular direction of motion of the running rod 2 will provide one particular direction of rotation of one sheave 15a, whereas the other sheave 15b rotates in the opposite direction. By the interconnection of the free-wheels 16a, 16b by way of the drive chain 17, the first and second free-wheels 16a, 16b will alternately provide for the drive shaft 19a of the generator 19 to be kept in a unidirectional direction of rotation as the running rod alternates between the upward and downward directions of motion.

To the running rod 2 ballast 70 is connected via an extension 4a of the driving line 4.

The generator 19 is connected to a distribution grid (not shown) for energy via lines 35 extended along the sea floor 6 to a consumer, for example a switching and transformer station (not shown) in the event of the generator 19 being an electric generator.

In an AC power station the generator 19 comprises means (not shown) known per se, to maintain a prescribed frequency on the alternating voltage produced.

At the first driving line 4 for the first float 3 there is arranged a second driving line 9, this being connected to the ballast 70 and being connected at an opposite end to a second float 8 floating on the water surface 5 at a distance from the first float 3. The second driving line 9 is passed over several sheaves 91 which are anchored to the sea floor 6.

For the second driving line 9 there is arranged a device 7 for adjusting the distance between the first and the second floats 3, 8. The device 7 comprises a driving line guide 71, an actuator 72 attached to the main module 1, means (not shown) for registering the speed of the running rod 2, means (not shown) for calculating the wave frequency at the first float, a connection 73 of tensile strength between the driving line guide 71 and the actuator 72 and also buoyancy means 74 and anchoring means 75, 76.

Figure 3:
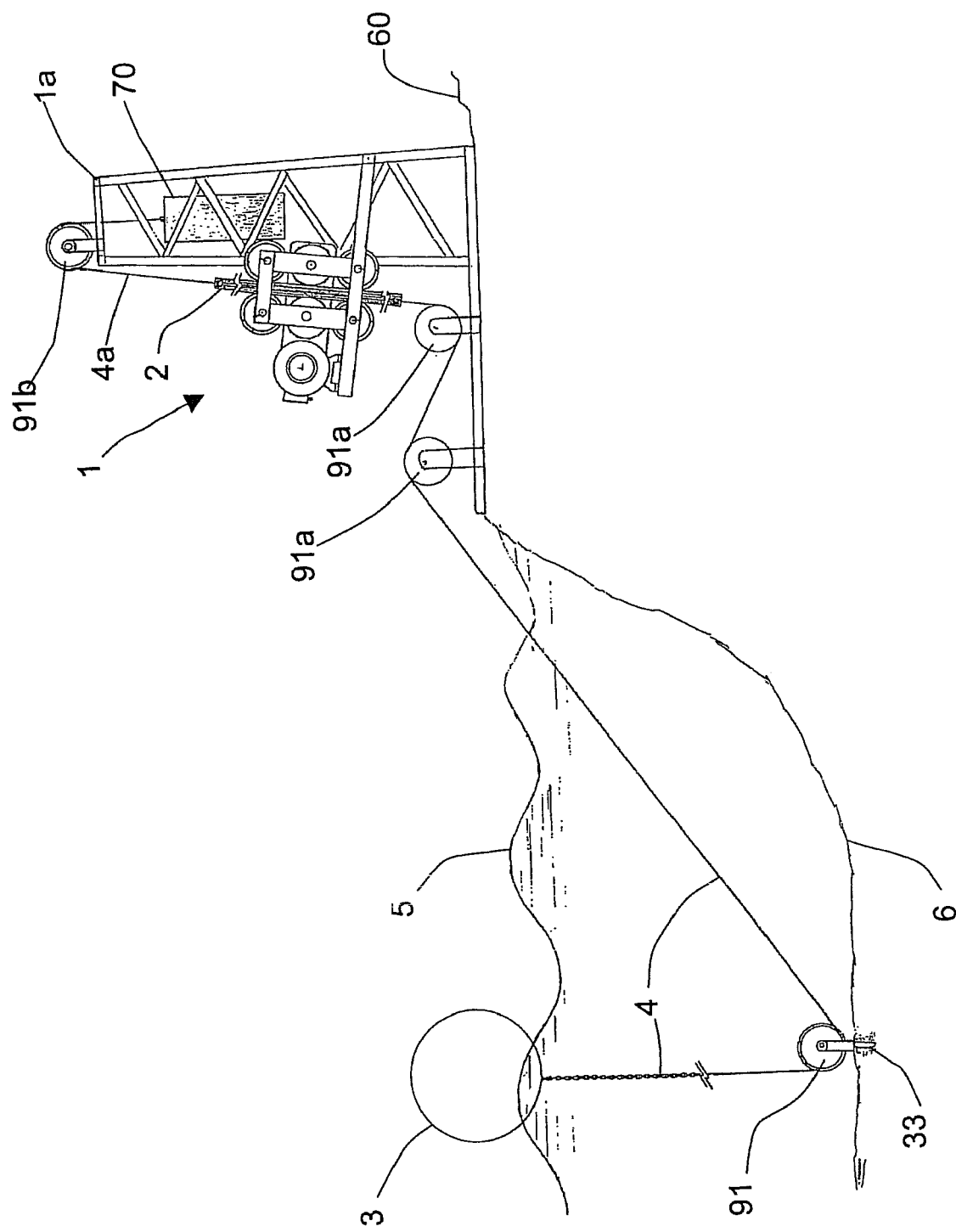
FIG. 3 shows a wave-powered generator, in which the main module is placed on land.

FIG. 3 shows an exemplary embodiment, in which the main module 1 is placed on land 60, the primary driving line 4 being extended via sheaves 91, 91a to one end of the running rod 2 which is connected, at its other end, to the ballast 70 via the driving line extension 4a. The driving line extension 4a is passed over a sheave 91b which is arranged on a tower 1a, and here the ballast is hangingly disposed in the tower 1a. Beyond that, this exemplary embodiment is arranged as described for corresponding elements above.

By the upward movement of the first float 3 by the waves 5, the running rod 2 is lifted as the sheaves 15a, 15b rotate on the side surfaces of the running rod 2. Because of the orientation of the free-wheels 16a, 16b and the interconnection of the sprockets 16c via the drive chain 17, the rotation of only one of the sheaves 15a, alternatively 15b, will be transmitted to the drive shaft 19a of the generator 19 via the gearwheels 18a, 18b, 18c, 18d as the free-wheel 16a, alternatively 16b, on the other one of the sheaves 15a, alternatively 15b, is running freely. As the float 3 begins to fall into a wave trough, the running rod 2 is lowered by means of gravity and the ballast 70 as a downward movement reverses the direction of rotation of the sheaves 15a, 15b rolling on the side surfaces of the running rod 2. In this situation the other one of the sheaves 15a, alternatively 15b, takes over the operation of the generator 19, as the free-wheel 16a, alternatively 16b, of this sheave 15a, alternatively 15b, engages, whereas the other one of the freewheels 16a, alternatively 16b, runs freely. Thereby a uniform direction of rotation is maintained in the generator 19.

There are other possibilities for maintaining a uniform direction of rotation in the generator 19 by an alternating direction of motion of the running rod 2. For example, sheaves may be used only on one side of the running rod 2, this/these being provided with two free-wheels (not shown) arranged in such a way that, for example, one free-wheel is rotating r clockwise and the other one is rotating anti-clockwise, and one free-wheel is transmitting rotation via an intermediate wheel, so that the opposite direction of rotation of the sheave is turned into the right direction.

When the distance between the first and second float 3, 8 is adjusted to the wave frequency and length in such a way that when the first float 3 is on a wave crest, and the other float 8 is, at the same time, in a wave trough, the movements of the floats 3, 8 will cooperate to enable the production of larger amounts of energy than if the running rod 2 is to be pulled down only by means of gravity and the weight of the ballast 70.

The distance between the floats 3, 8 is adjusted to the wave frequency and length by the device 7 registering the movement of the running rod 2, calculating the frequency and, by means of the actuator 72, adjusting the driving line guide 71 in such a way that the second float 8 takes a distance to the first float 3, such that it is in an opposite phase to the movement of the first float 3.

By arranging the main module 1 as shown in FIG. 3, some structural and operational problems caused by water, especially sea water, will be reduced or eliminated.

To a person skilled in the art it is obvious to combine a wave-powered generator with floats 3, 8 in opposite phases with a main module 1 placed on land 60.

What is claimed is:

1. A device for a wave-powered generator comprising:
   a main module provided with at least one generator which via a transmission means and a primary driving line is connected to a first float arranged to float on a water surface; and
   a second float, arranged to float on the water surface and connected to the primary driving line via a secondary driving line and positioned at a distance from the first float,
   wherein the transmission means comprises:
   a first drive shaft provided with a first freewheel and a first sheave;
   a second drive shaft provided with a second freewheel and a second sheave;
   a running rod connected to the primary driving line and in engagement with each of the first sheave and the second sheave,
   wherein the primary driving line is attached to ballast arranged to maintain tension in the primary driving line over the first sheave and the second sheave when the main module is floating above a sea floor and further arranged to rotate the transmission means when the first float is moving downward,
   wherein the running rod has a cogged portion engaged with each of the first sheave and the second sheave,
   wherein the main module is provided with buoyancy elements and anchoring means fixed to a seabed, and
   further comprising:
   a device for controlling a distance between the first float and the second float, comprising a positioning guide for the secondary driving line;
   means for registering the speed and the direction of a movement of the primary driving line;
   means for calculating a desired distance between the first float and the second float; and
   a device arranged to control a distance between the positioning guide and the primary driving line.

2. The device for a wave-powered generator of claim 1, wherein the distance between the first float and the second float is substantially a function of wave frequency and wavelength such that when the first float is on a wave crest, then the second float is in a wave trough.

3. The device for a wave-powered generator of claim 1, characterized in that the at least one generator is an electrical generator or a pump.

* * * * *